Nov. 9, 1965   H. E. EYRICH   3,216,242
SOIL-TESTING APPARATUS
Filed Aug. 30, 1962   2 Sheets-Sheet 1
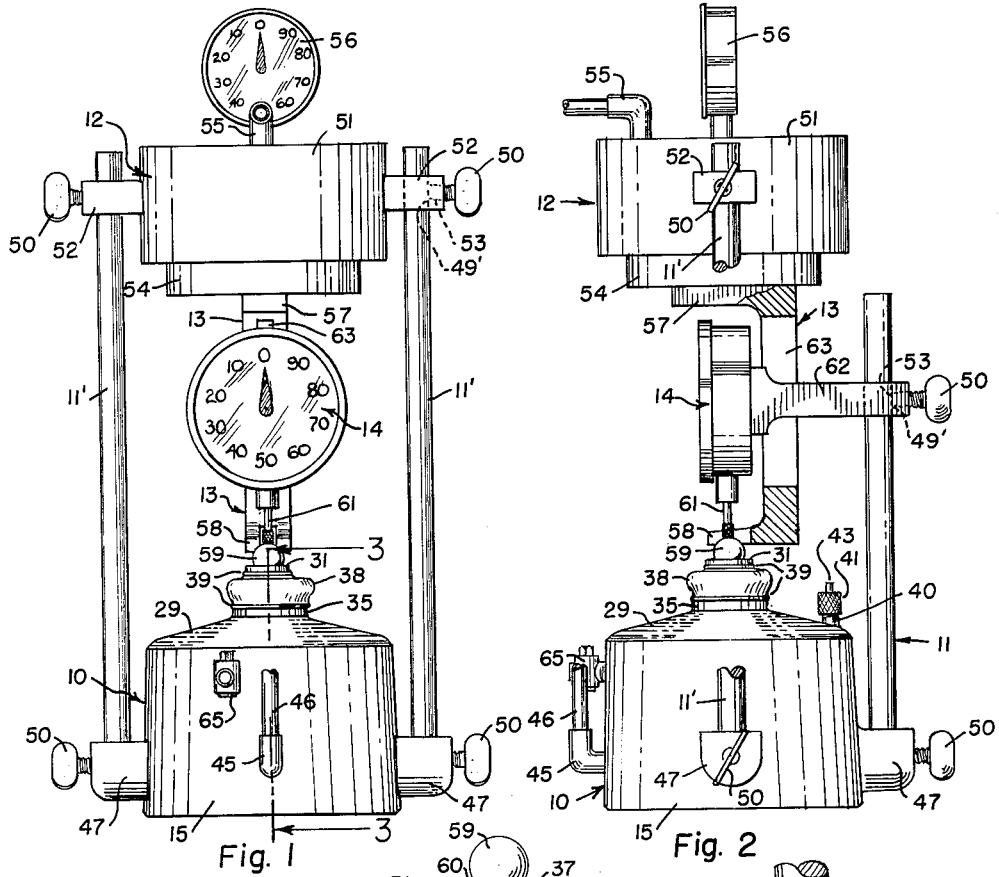
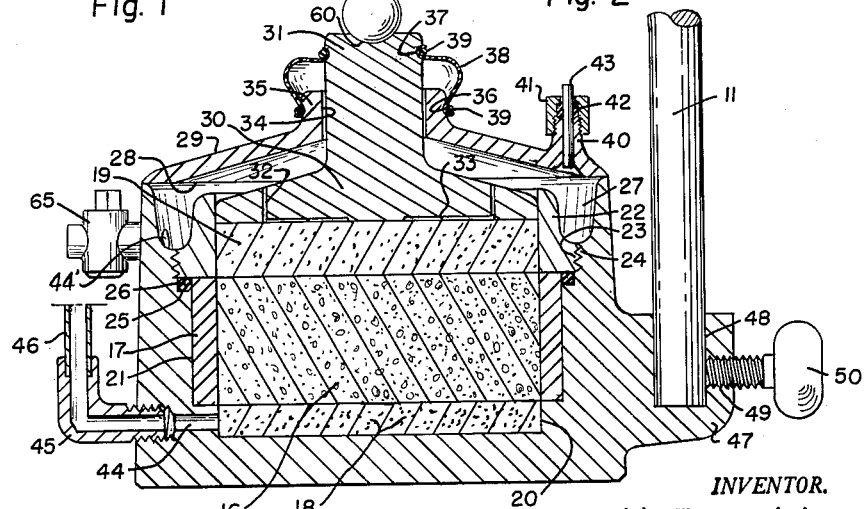
Fig. 1
Fig. 2
Fig. 3
INVENTOR.
Harold E. Eyrich
BY WHITEHEAD, VOGL & LOWE
PER *Frank C. Lowe*
ATTORNEYS Nov. 9, 1965　　　　　H. E. EYRICH　　　　　3,216,242
SOIL-TESTING APPARATUS
Filed Aug. 30, 1962　　　　　　　　　　　　2 Sheets-Sheet 2
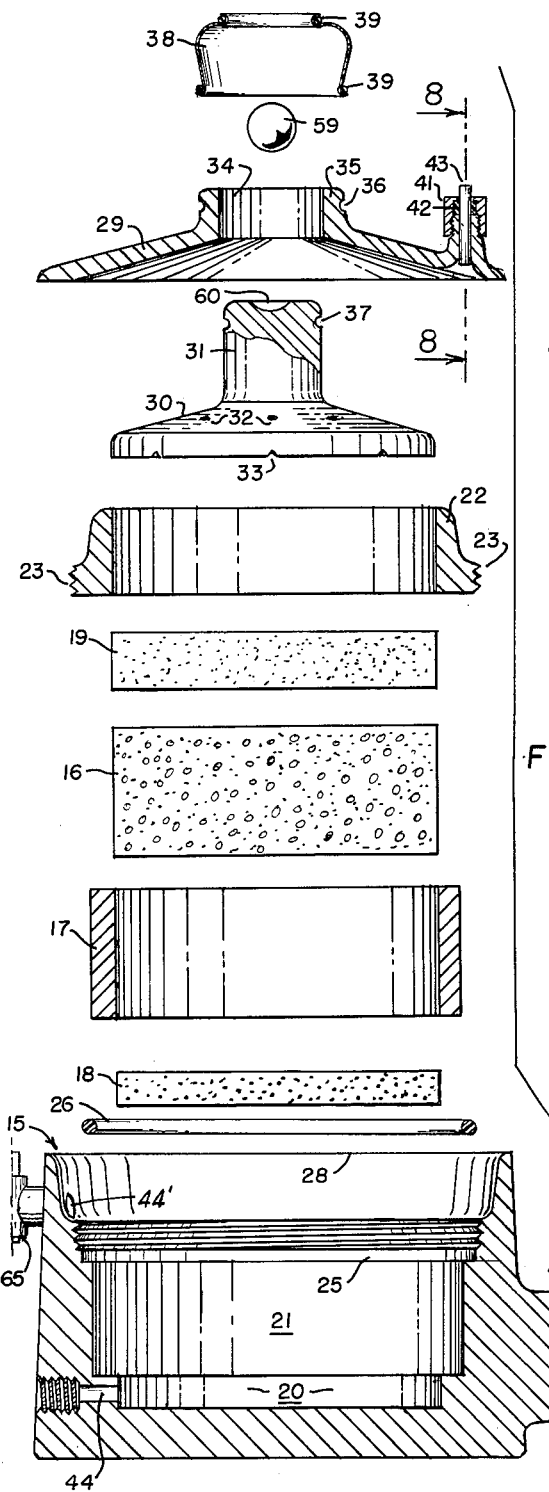
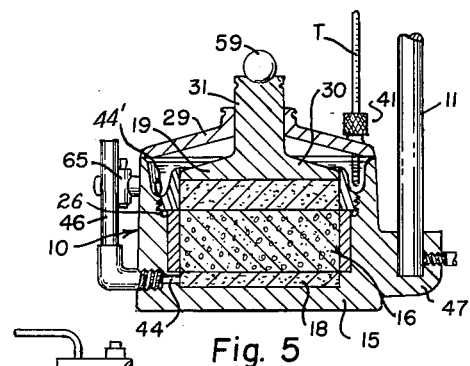
Fig. 5
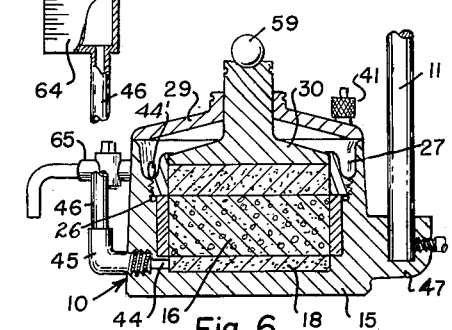
Fig. 4　　Fig. 6
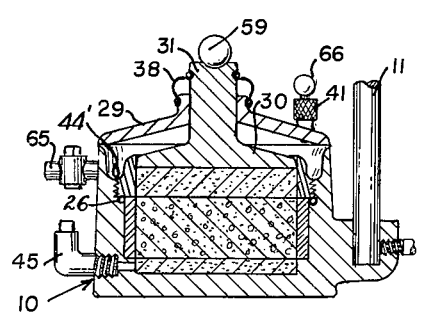
Fig. 7
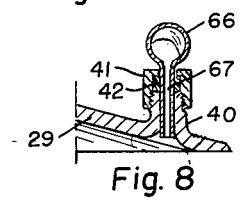
Fig. 8
INVENTOR.
Harold E Eyrich
BY WHITEHEAD, VOGL & LOWE
PER Frank C. Lowe
ATTORNEYS United States Patent Office 3,216,242
Patented Nov. 9, 1965

3,216,242
SOIL-TESTING APPARATUS
Harold E. Eyrich, 1660 King St., Denver, Colo.
Filed Aug. 30, 1962, Ser. No. 220,406
7 Claims. (Cl. 73—94)

This invention relates to means and apparatus for testing soils and more particularly to apparatus to study the consolidation and time-consolidation relationships of soils such as silts, clays and like materials which are hereinafter referred to generally as soils. As such, the invention will be hereinafter referred to as a soil testing apparatus.

A primary object of the invention is to provide a novel and improved apparatus for testing soils which is adapted to establish soil consolidation or swell and time-consolidation relationships and at the same time determine other important characteristics of soils such as the porosity and permeability factors. In referring to a swell, or expansion, it is to be understod that consolidation as hereinafter referred to may be either in a positive or negative sense.

Another object of the invention is to provide a novel and improved soil-testing apparatus which is arranged to permit various selected sequences of tests upon a soil sample to determine various soil properties when consolidation is taking place, such as changes which relate to peremability, porosity.

Another object of the invention is to provide a novel and improved soil-testing apparatus which is further adapted to measure consolidation ratio under various conditions of humidity as well as the consolidation rates when submerged in water.

Other objects of the invention are to provide a novel and improved soil-testing apparatus which is a small, compact, light-weight unit especially suitable for use in the field as well as in the testing laboratory, which is a versatile unit adapted to use small standard-sized samples, and capable of producing reliable, economical information therewith.

With the foregoing and other objects in view, all of which more fully hereinafter appear, my invention comprises certain improved constructions, combinations and arrangements of parts and elements as hereinafter described, defined in the appended claims and illustrated in preferred embodiment in the accompanying drawing, in which:

FIGURE 1 is a front elevational view of the improved soil testing apparatus as arranged for commencement of a test in an ordinary manner and with certain tubular elements being broken away to permit better viewing of other portions and other several components therein.

FIGURE 2 is a side elevational view thereof.

FIGURE 3 is a sectional view of a portion of the apparatus as taken substantially from the indicated line 3—3 at FIG. 1, but on an enlarged scale and illustrating a soil sample in place and ready for testing.

FIGURE 4 is an exploded view of the components illustrated at FIG. 3.

FIGURE 5, 6 and 7 are fragmentary sectional views similar to the showing at FIG. 3, but with arrows and other indications illustrating the use of the apparatus under various testing conditions.

FIGURE 8 is a fragmentary sectional detail as taken from the indicated line 8—8 at FIG. 4 to illustrate the use of selected vapor producing means in the apparatus.

Conventional soil consolidation tests are adapted to establish the rate of change of volume of a soil by compressing a soil sample under water. Such a test gives an indication of the degree of the consolidation and of the length of time when an apparent or effective consolidation is completed. A typical form of such conventional apparatus is disclosed in the patent to R. H. Karol, issued October 29, 1957, No. 2,811,038.

Generally a soil test consists of compressing a short cylinder of a soil sample between two porous discs which permit water to escape from the sample as it is being consolidated. The typical test procedures leave much to be desired for often the engineer needs to know the effects of permeability before and after consolidation. Additional independent tests based on theoretical considerations are usually necessary to determine these factors. Also, in other instances, ordinary compaction tests, especially under water, are unrealistic as where arid field conditions prevail. It follows that there is a real and definite need for a soil-testing apparatus which is more versatile and which can give additional engineering information and especially with the same soil sample.

The present invention was conceived and developed with such need in view, and comprises, in essence, an improved arrangement of a soil-testing chamber wherein a sample may be placed for testing, either submerged or dry or with controlled humidity. With this aparatus direct measurements may be made to establish both the permeability and consolidation or swell properties without independent set-ups. All such tests may be made with a single sample.

Refering more particularly to the drawing, FIGS. 1 and 2 show one arrangement of the soil testing apparatus which is formed as a small, compact unit, easily portable and suited for laboratory or field use. The primary components of the apparatus either in the form shown, or with other more conventional types of load applying or measuring equipment include a testing chamber 10 wherein samples are placed for testing, support rods 11 and 11' which upstand from the sides of the chamber, a load-measuring and applying press 12 which is affixed to the top of support rods 11' in the present disclosure or which may be otherwise held above chamber. A connecting arm 13 depends from the press to connect with movable elements in the chamber and a deflection-indicating dial gauge 14 which is affixed to a suport rod 11 above the chamber in a position adapted to contact the movable elements of the chamber, all as hereinafter described in further detail.

The chamber 10, illustrated in section at FIG. 3 and as a portion of the exploded view at FIG. 4 is a cup-like body 15 which is generally cylindrical in form with the interior portion being turned to form a sequence of stepped, cylindrical sections adapted to receive the several components which properly hold a soil sample for soil testing.

A typical soil sample 16 is formed as a short cylindrical unit confined within a cylindrical ring 17 with the surfaces of the soil being flatly flush with the ends of the ring 17 when a test is to begin, as illustrated at FIG. 3 of the drawing. The soil sample is conventionally placed between a lower porous disc 18 and an upper porous disc 19. The upper disc 19 is thicker than the disc 18 to permit the apparatus to be used for a double-deflection type of test as will be hereinafter described. In the present construction it is contemplated that the diameter of these disks will be slightly smaller than the diameter of the soil sample and the internal diameter of the soil ring 17.

The interior chamber of the body 15 includes a bottom chamber section or socket 20 which is adapted to receive and contain the bottom disc 18. Above this bottom section 20, the chamber enlarges to a soil-ring receiving section 21 which is adapted to receive and contain the ring 17 and the soil sample 16 therein.

The upper disc 19 is adapted to be pressed against the soil sample 16 and to move into the ring 17 as the soil sample consolidates. To insure such movement, this disc 19 is slideably mounted in a sleeve 22 whose internal diameter is the same as that of the ring 17. This sleeve is mounted within the chamber directly upon and in axial alignment with the ring 17. The lower portion of the outer periphery of the sleeve is threaded as at 23, and these threads mesh with and may be turned into a corresponding threaded portion 24 in the chamber above ring-receiving section 21. When the sleeve is turned into position, the ring 17 and soil sample 16 therein are firmly affixed in the chamber and in position for testing.

An internal shoulder 25 is formed in the chamber immediately below the threads 24 and an O-ring 26 is placed within this shoulder portion to be compressed against the ring 17 and the wall of the chamber 15 by the sleeve 22, the O-ring 26 thereby providing an effective water seal between the upper and lower portions of the ring 17 to prevent water leakage about the ring 17 which would otherwise occur because of the necessity of providing clearances between the several components.

The upper portion of the outer periphery of the sleeve 22 is spaced away from the wall of the chamber 15 opposing this portion to form a moat 27 wherein a ring of water may be placed whenever certain types of tests are made as hereinafter described. At this moat section, the internal portion of the chamber is enlarged so that the chamber walls are comparatively narrow and terminate as a flat top lip 28. This lip 28 is preferably finished to define a smooth plane surface for a vapor tight fit with a cap 29, hereinafter further described. The upper portion of the outer side of the sleeve 22 forming the internal wall of the moat 27 is also narrowed and the top lip of this portion terminates a short distance below the outer-wall lip 28 as clearly illustrated at FIG. 3.

A circular platen 30 slideably fits within the sleeve 22 to press against the upper porous disc 19 and this platen is formed with an axially-centered upstanding shank 31 which extends sufficiently above the chamber for connection with the arm 13 in a manner hereinafter described. This platen is formed with suitable passages 32 through it which will permit an uninterrupted flow of water from the upper porous disc 19 when the platen is being pressed against the disc 19 and water is forced upwardly through the sample. The undersurface of the platen may include an arrangement of slots or channels 33 leading to the passages 32 to facilitate such flow.

The cap 29 which is adapted to cover the chamber 15 is formed as a comparatively flat conical unit having a central opening 34 of the cap and the shank 31 by extending the crown portion of the cap upwardly as a short cylindrical boss 35 having a peripheral groove 36 therein. A second peripheral groove 37 is cut in the portion of the shank 31 which extends above the boss 35 and a loosely fitting, thin-wall, resilient tubular membrane 38 is affixed to the boss 35 and shank 31 by resilient ring-bands 39 set in the respective grooves in these members to hold the membrane in place. An impermeable material such as latex or nylon may be used for this purpose.

The cap may also contain a suitable boss 40 at one side which has a passageway therethrough to receive a thermometer for measuring the temperature of water in the moat 27 or to receive and hold a vapor producing bulb as hereafter described. This boss is suitably threaded to receive a packing nut 41 wherein a packing ring 42 is mounted to normally close off the passageway as by a plug 43 extending therethrough or to receive and hold a thermometer or the like when the plug is removed.

To complete this assemblage of elements associated with the chamber 15, a lateral passageway 44 extends through the wall of the chamber and to the bottom section 20 to permit fluid flow between the bottom section 20 and the exterior of the chamber. The passageway 44 entrance is suitably threaded to receive a pipe fitting 45 for connection with a tubular supply pipe 46 which may, or may not be connected with a pressure source, depending upon the nature of the test being performed. A second passageway 44' extends through the wall of the chamber to the moat 27 to provide a drain from the moat. This drain may include a fitting and pipe, not shown, and it may also include a shut-off cock 65 as hereinafter described.

A suitable, comparatively heavy boss 47 outstands from the sidewall of the chamber to support the rods 11 and 11'. Each boss contains a socket 48 to receive and hold the base of the support rod 11 or 11', the rods being preferably a rigid and cylindrical form. A suitable threaded orifice 49 extends through the side of each boss to receive a wing nut 50 which may be turned against a rod 11 or 11' to lock it in position.

The press 12 is preferably a hydraulic unit, formed as a cylinder body 51. This cylinder is supported upon the pair of diametrically opposing rods 11' by lugs 52 outstanding from the wall of the body, each lug including an orifice 53 through which its rod 11' slideably extends. Each lug also includes a threaded orifice 49' at its side to hold a wing nut 50 for locking the body in position. A piston 54 depends from this cylinder body 51 and the top of the connecting arm 13 is attached to this cylinder. Fluid under pressure operates this press 12 and is supplied to the cylinder body 51 from a suitable valve-controlled supply line 55 which may enter the top of the cylinder body. Means, not shown, will be provided to supply fluid such as oil under pressure through this line and a suitable pressure gauge 56 is conveniently located at the top of the cylinder body to indicate the actual pressure of force being applied.

It is contemplated that the press 12 will be axially centered with, and above the testing chamber 10 and that the dial gauge 14 will also be mounted along this vertical central axis which is directly over the platen shank 31. Accordingly, the arm 13 is formed as an offset unit having an upper offset foot 57 contacting and bearing against the under-surface of the piston 54 and a lower offset foot 58 contacting and bearing upon a centering ball 59 which is conveniently placed in a socket 60 at the top of the shank 31.

The dial gauge 14 is ordinarily a disc-shaped unit having an extensiometer arm 61 depending one side thereof to rest upon the ball 59. The lower offset foot 58 is conveniently divided at the point of ball contact to permit the extensiometer arm to contact the top of the ball as clearly illustrated at FIG. 1.

The dial gauge 14 includes an outstanding lug 62 having an orifice 53 therethrough to permit it to be slideably mounted upon the support rod 11. The lug also includes a threaded orifice 49' at its side to receive a wing nut 50 for locking the dial gauge in position. In the arrangement of the elements so described, it is desirable to have the arm 13 behind the dial gauge and in preferred construction, the arm 13 is formed with a longitudinal slot 53 therein through which the lug of the dial gauge projects, as clearly illustrated at the FIG. 3.

FIGURES 5, 6 and 7 illustrate various applications of the unit. At FIG. 5, the soil sample is completely submerged in water as for a conventional consolidation test and although illustrated as being in place, the cap 29 may be removed for this test. In this test all conditions are static with the passages 44 and 44' being conveniently closed to permit the chamber to fill with water. The only measurements recorded will be the degree of soil consolidation with respect to time.

At FIG. 6, the soil sample is again submerged, but under unbalanced water pressures in order to measure the permeability. The tube 46 is modified to include a pressure-producing flow measuring device, generally indicated as 64 which applies water under pressure to the lower porous disc 18. Water entering this disc flows through the sail sample to flow over the top of the sleeve 22 and into the moat. Thence, the flow may escape from the moat through passage 44'. A suitable plug valve 65 may be used in this line for easily opening and closing the passage 44'. The rate of flow through the sample and pressure required to produce the flow permits a determination of the permeability of the soil. With this flow continuing, and with pressure being applied to the platen 30, a relationship of permeability to consolidation can be measured, the permeability decreasing as consolidation takes place.

FIGURE 7 illustrates a set up for a consolidation test without submerging the sample. For such a consolidation test, it is desirable to control the humidity. First, the passages 44 and 44' are closed or suitably plugged, the lid 29 sealed and the membrane 38 is fitted over the lid boss 35 and the shank 31. With a dry sample in place, 100 percent humidity may be effected either by a partial filling of the moat 27 or by the use of a moisture bulb 66 having a stem portion 67 which may extend through the opening of boss 40 as in the manner illustrated at FIG. 8. After the sample is allowed to set for a suitable period to acquire equilibrium of vapor conditions, the consolidation measurements can proceed by loading the platen.

For the other extreme, with no water vapor, a dessicant such as calcium chloride may be placed in the moat. After a time period suitable to remove all traces of moisture vapor, the soil consolidation measurements can commence. Mild heating can be effected to produce a condition of complete dryness.

A soil sample within the ring 17 is ordinarily tested by pressing only the upper disc 19 into the ring 17 as consolidation occurs. Another mode of testing which is desirable for highly sensitive and tenacious soils, such as clay, calls for a testing procedure where a disc is pressed into the ring from each side of the sample to minimize the effect of friction of the soil adhering to the inner wall of the ring 17. In single-disc-movement procedure, it is important to maintain the surface of the bottom disc 18 flush with the base of the ring 17 and accordingly to make the thickness of disc 18 the same as the depth of the socket 20. The double-direction-disc-movement testing cannot be made with this flush arrangement.

However, when the disks are reversed and the thicker disc 19 is fitted into the socket 20, it extends into the ring-receiving section 21. The soil sample within the ring 17 will then rest upon the disc 19 even though the ring is not completely fitted into its section 21. Disc 18 is then fitted into the retainer ring 22 and will rest upon the top of the soil sample. It is to be noted that in this special arrangement, the ring 22, as illustrated, cannot be screwed into the threads 24 tightly, for it cannot bear against the ring 17 and push it and the sample within it against the disc 19. However, it may be positioned in the threads and turned partially into place sufficiently to keep the disc 18 in proper alignment. With this arrangement, the test may proceed as hereinbefore described, but with both disks being pressed into the soil of the sample.

Other and further tests can be made with the apparatus, which I have now described in considerable detail. It is also apparent that others skilled in the art can build and devise alternate and equivalent constructions which are within the spirit and scope of my invention. Hence, I desire that my protection be limited, not by the constructions illustrated and described, but only by the proper scope of the appended claims.

I claim:

1. A soil consolidation measurement apparatus adapted to compress and measure the compression of a soil sample contained within and flushly filling a cylindrical sample ring and comprising in combination therewith:
    (a) a porous bottom disk adapted to be positioned against and to support the undersurface of the soil sample within the ring;
    (b) a porous upper disc having a diameter slightly less than the internal diameter of the ring and being adapted to be positioned against the upper surface of the soil sample within the ring;
    (c) a cup-like body having cylindrically stepped inner chamber portions with the bottom portion being adapted to receive and hold the bottom disc and with an adjacent portion being adapted to receive and hold the sample ring with the base of the ring being at the surface of the disc;
    (d) a restraining sleeve having an internal diameter substantially the same as the internal diameter of the sample ring, and being adapted to be mounted within a chamber portion in the body over the ring and to hold the upper disc in position upon the upper surface of the soil sample within the ring and to hold the soil sample in its cylindrical form should swelling of the sample occur;
    (e) an annular space between the chamber portion of the inner wall of the cup and the said retaining sleeve adapted to form a moat about the sleeve and above the sample ring;
    (f) an annular seal between the restraining sleeve, the sample ring and the body inner wall adapted to prevent bypass and leakage of water from the moat whereby to permit permeability measurements with the apparatus;
    (g) means for applying a force against the upper disc to push it against the soil sample and thereby effect compression thereof; and,
    (h) means adapted to measure the movement of the upper disc responsive to the effect of the force-applying means.

2. A soil consolidation measurement apparatus adapted to compress and measure the compression of a soil sample contained within and flushly filling a cylindrical sample ring and comprising in combination therewith:
    (a) a porous bottom disc adapted to be positioned against and to support the undersurface of the soil sample within the ring;
    (b) a porous upper disc having a diameter slightly less than the internal diameter of the ring and being adapted to be positioned against the upper surface of the soil sample within the ring;
    (c) a cup-like body having cylindrically stepped inner chamber portions with the bottom portion being adapted to receive and hold the bottom disc and with an adjacent portion being adapted to receive and hold the sample ring with the base of the ring being at the surface of the disc;
    (d) a restraining sleeve having an internal diameter substantially the same as the internal diameter of the sample ring, and being adapted to be mounted within a chamber portion in the body over the ring and to hold the upper disc in position upon the upper surface of the soil sample within the ring and to hold the soil sample in its cylindrical form should swelling of the sample occur;
    (e) an annular space between the chamber portion of the inner wall of the cup and the sleeve adapted to form a moat about the sleeve above the sample ring, a seal means between the ring and body, a valved passageway through the wall of the body and to the moat adapted to permit drainage of the moat and fluid passage means into the bottom portion of the cup, whereby to permit a fluid flow through the sample to effect a measurement of the permeability of the sample;
    (f) means for applying a force against the upper disc to push it against the soil sample and thereby effect compression thereof; and,
    (g) means adapted to measure the movement of the upper disc responsive to the effect of the force-applying means.

3. A soil consolidation measurement apparatus adapted to compress and measure the compression of a soil sample contained within and flushly filling a cylindrical sample ring and comprising in combination therewith:

(a) a porous bottom disc adapted to be positioned against and to support the undersurface of the soil sample within the ring;

(b) a porous upper disc having a diameter slightly less than the internal diameter of the ring and being adapted to be positioned against the upper surface of the soil sample within the ring;

(c) a cup-like body having cylindrically stepped inner chamber portions with the bottom portion being adapted to receive and hold the bottom disc and with an adjacent portion being adapted to receive and hold the sample ring with the base of the ring being at the surface of the disc;

(d) a restraining sleeve having an internal diameter substantially the same as the internal diameter of the sample ring, and being adapted to be mounted within a chamber portion of the body over the ring and to hold the upper disc in position upon the upper surface of the soil sample within the ring and to hold the soil sample in its cylindrical form should swelling occur;

(e) an annular space between the chamber portion of the inner wall of the cup and the sleeve adapted to form a moat about the sleeve, a seal means between the sleeve, sample ring and body wall adapted to water seal the moat, and a substantially vapor-tight closure cover means adapted to close off the top opening of the body, whereby to subject the sample to high humidity when water is placed in the moat and to low humidity when a dessicator is placed in the moat;

(f) means for applying a force against the upper disc responsive to the effect of the force applying means.

4. A soil consolidation measurement apparatus adapted to compress and measure the compression of a soil sample contained within and flushly filling a cylindrical sample ring and comprising in combination therewith:

(a) a porous bottom disc having a diameter slightly less than the internal diameter of a ring adapted to be positioned against and to support the undersurface of the soil sample within the ring;

(b) a porous upper disc having a diameter slightly less than the internal diameter of the ring and being adapted to be positioned against the upper surface of the soil sample within the ring;

(c) a cup-like body having cylindrically stepped inner chamber portions with the bottom portion being adapted to receive and hold the bottom disc and with an adjacent portion being adapted to receive and hold the soil sample ring with the base of the ring being at the surface of the disc;

(d) a restraining sleeve having an internal diameter substantially the same as the internal diameter of the sample ring, and being adapted to be mounted within a chamber portion in the body over the ring and to hold the upper disc in position upon the upper surface of the soil sample within the ring and to hold the soil sample in its cylindrical form should swelling of the sample occur;

(e) an annular space between the upper portion of the inner wall of the cup and the sleeve adapted to form a moat about the sleeve, and annular seal means at the junctures between the restraining sleeve, the sample ring and the body inner wall adapted to prevent leakage of water, a first passageway through the wall of the body below the sample ring and a second passageway through the wall of the body and to the moat, whereby a flow of fluid through the first said passageway into the body and from the second said passageway may be effected to measure permeability of the sample;

(f) a platen adapted to fit within the restraining sleeve and to rest upon the upper surface of the upper disc;

(g) means for applying a force against the platen to push the upper disc against the soil sample and thereby effect compression of the sample; and, (h) deflection indicating means adapted to measure the platen movement under force application and thereby indicate soil consolidated effects.

5. The organization set forth in claim 4 including passageway means into the base of the body and to the underside of the sample ring adapted to permit a flow of water through the sample whereby to measure simultaneously, the compression and permeability of the sample.

6. Apparatus for a combined compression-permeability test on a soil sample of the type which is contained within a cylindrical sample ring, and comprising in combination therewith:

(a) a porous bottom disc adapted to be positioned against the undersurface of the soil sample;

(b) a porous upper disc having a diameter slightly less than the internal diameter of the ring and being adapted to be positioned against the upper surface of the soil sample within the ring;

(c) a cup-like body adapted to contain the bottom disc and sample ring within its cavity;

(d) a seal means within the cup cavity adapted to effect a fluid seal between the ring and cavity to separate the cup cavity into a lower enclosed portion and an open upper portion;

(e) means adapted to apply a force against the upper disc to push it against the soil sample and thereby effect compression thereof;

(f) means adapted to measure the movement of the upper disc responsive to the effect of the force-applying means; and, (g) means adapted to simultaneously flow fluid under pressure into the enclosed lower portion of the cup cavity and to measure the pressure and flow rate thereof, whereby to determine the permeability of the sample when under compression.

7. In the organization set forth in claim 6, including a moat about the upper disc to receive water flowing through the sample and a drain from said moat adapted to collect and facilitate measurement of water flow therefrom.

References Cited by the Examiner
UNITED STATES PATENTS

| | | | |
|---|---|---|---|
| 2,810,289 | 10/57 | Button | 73—94 |
| 2,811,038 | 10/57 | Karol | 73—94 |
| 3,035,437 | 5/62 | Watkins et al. | 73—94 |
| 3,054,286 | 9/62 | Karol | 73—94 |

OTHER REFERENCES

Tinius Olsen Bulletin 50–A, "Karol-Warner Physical Soil Testing Equipment," 1959, p. 4, published by Tinius Olsen Testing Machine Co., Easton Road, Willow Grove, Pa.

RICHARD C. QUEISSER, *Primary Examiner.*

JOSEPH P. STRIZAK, *Examiner.*